United States Patent
Hashimoto et al.

(10) Patent No.: US 8,157,045 B2
(45) Date of Patent: Apr. 17, 2012

(54) OCCUPANT PROTECTION DEVICE AND CONTROL METHOD THEREOF

(75) Inventors: Syuzo Hashimoto, Toyota (JP); Morio Sakai, Toyota (JP)

(73) Assignees: Toyota Jidosha Kabushiki Kaisha, Toyota (JP); Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 13/130,434

(22) PCT Filed: Nov. 26, 2009

(86) PCT No.: PCT/IB2009/007571
§ 371 (c)(1), (2), (4) Date: May 20, 2011

(87) PCT Pub. No.: WO2010/061279
PCT Pub. Date: Jun. 3, 2010

(65) Prior Publication Data
US 2011/0221247 A1  Sep. 15, 2011

(30) Foreign Application Priority Data
Nov. 27, 2008  (JP) ................. 2008-302271

(51) Int. Cl.
 B60R 22/00  (2006.01)
 B60R 22/48  (2006.01)
(52) U.S. Cl. .................. 180/268; 180/274; 701/45
(58) Field of Classification Search .......... 180/268, 180/271, 272, 274, 282; 280/804, 806, 807; 701/45, 49; 307/10.1; 297/216.1, 216.16, 297/216.17
See application file for complete search history.

(56) References Cited

U.S. PATENT DOCUMENTS

| | | | |
|---|---|---|---|
| 4,807,715 A * | 2/1989 | Nagashima et al. | 180/268 |
| 6,463,372 B1 * | 10/2002 | Yokota et al. | 701/45 |
| 6,527,298 B2 * | 3/2003 | Kopetzky | 280/806 |
| 6,666,292 B2 * | 12/2003 | Takagi et al. | 180/274 |
| 7,195,092 B2 * | 3/2007 | Wu et al. | 180/282 |
| 2004/0212226 A1 | 10/2004 | Bethge et al. | |
| 2005/0071053 A1 * | 3/2005 | Yamada et al. | 701/1 |
| 2006/0249946 A1 * | 11/2006 | Bachmann et al. | 280/806 |
| 2007/0169979 A1 * | 7/2007 | Mohammad | 180/268 |

(Continued)

FOREIGN PATENT DOCUMENTS
DE  103 21 871 A1  2/2004
(Continued)

OTHER PUBLICATIONS
International Search Report issued in PCT/IB2009/007571, mailed Mar. 24, 2010.
(Continued)

*Primary Examiner* — Joseph Rocca
(74) *Attorney, Agent, or Firm* — Oliff & Berridge, PLC (57) ABSTRACT

An occupant protection device includes a seat belt that restrains an occupant, an adjusting device that relatively adjusts a positional relationship between the seat belt and the occupant, a collision predicting portion that predicts a collision, and a control portion that controls the adjusting device when the collision is predicted by the collision predicting portion. The control portion first operates the adjusting device at a first speed to restrain the occupant by the seat belt, and then operates the adjusting device to increase the distance between the seat belt and the occupant at a second speed that is slower than the first speed.

11 Claims, 8 Drawing Sheets

U.S. PATENT DOCUMENTS

| | | |
|---|---|---|
| 2007/0185635 A1 | 8/2007 | Mattes et al. |
| 2007/0194565 A1* | 8/2007 | Clute .......................... 280/806 |
| 2008/0262679 A1 | 10/2008 | Baumann et al. |
| 2010/0280718 A1 | 11/2010 | Hashimoto et al. |

FOREIGN PATENT DOCUMENTS

| | | |
|---|---|---|
| EP | 1 518 743 A1 | 3/2005 |
| EP | 1 772 304 A2 | 4/2007 |
| JP | A 11-334437 | 12/1999 |
| JP | A 2001-322532 | 11/2001 |
| JP | A 2005-271889 | 10/2005 |
| JP | A 2007-500650 | 1/2007 |
| JP | A 2007-276715 | 10/2007 |
| JP | A 2008-504168 | 2/2008 |
| JP | A 2009-166596 | 7/2009 |
| WO | WO 01/45985 A1 | 6/2001 |

OTHER PUBLICATIONS

Written Opinion issued in PCT/IB2009/007571, mailed Mar. 24, 2010.

International Preliminary Report on Patentability issued in PCT/IB2009/007571, dated Mar. 7, 2011.

Office Action issued in JP 2008-302271, dated Oct. 28, 2010. (with English-language translation).

* cited by examiner

OCCUPANT PROTECTION DEVICE AND CONTROL METHOD THEREOF

BACKGROUND OF THE INVENTION

1. Field of the Invention

The invention relates to an occupant protection device, and more particularly, to an occupant protection device and control method thereof that protects an occupant during a vehicle emergency.

2. Description of the Related Art

An occupant protection device has been proposed that predicts a collision and protects an occupant by positioning the occupant in the appropriate posture by adjusting the reclining angle of a seat back of a vehicle seat when a collision has been predicted.

For example, Published Japanese Translation of PCT application No. 2007-500650 (JP-A-2007-500650) describes technology that predicts a collision and operates an actuator for adjusting a seat at a second speed that is faster than a first speed for making a comfortable adjustment when a collision has been predicted.

Although the technology described in JP-A-2007-500650 adjusts the seat at a faster speed when a collision has been predicted, there still remains room for improvement with regard to reducing discomfort and annoyance to the occupant when a collision is predicted or avoided.

SUMMARY OF THE INVENTION

This invention therefore provides an occupant protection device and control method thereof which is able to minimize discomfort and annoyance to an occupant when adjusting a seat when a collision is predicted.

Thus, one aspect of the invention relates to an occupant protection device that includes a seat belt that restrains an occupant, an adjusting device that relatively adjusts a positional relationship between the seat belt and the occupant, a collision predicting portion that predicts a collision, and a control portion that controls the adjusting device when the collision is predicted by the collision predicting portion. The control portion first operates the adjusting device at a first speed to restrain the occupant by the seat belt, and then operates the adjusting device to increase the distance between the seat belt and the occupant at a second speed that is slower than the first speed.

According to the occupant protection device described above, the positional relationship between the occupant and the seat belt that restrains the occupant can be adjusted by an adjusting device.

The collision predicting portion predicts a collision. When a collision is predicted by the collision predicting portion, the control portion controls the adjusting portion. More specifically, the control portion first operates the adjusting device at a first speed to restrain the occupant by the seat belt, and then operates the adjusting device to increase the distance between the seat belt and the occupant at a second speed that is slower than the first speed. That is, the occupant is reliably restrained by the seat belt when a collision is predicted. Then the adjusting device is adjusted to increase the distance between the seat belt and the occupant. Accordingly, the occupant is less restricted by the seat belt and thus is more comfortable. At this time, restraint of the occupant is eased by adjusting device at a second speed that is slower than the first speed, which is less annoying to the occupant.

Incidentally, the occupant protection device described above may also include an adjustment amount detecting portion that detects an adjustment amount of the adjusting device. The control portion may operate the adjusting device by the adjustment amount at the second speed. That is, the adjusting device is returned to its original state by being adjusted at low speed. As a result, the adjusting device can be returned to its original state without annoying the occupant.

Also, the occupant protection device described above may further include a collision detecting portion that detects the collision. The control portion may operate the adjusting device at the second speed when a predetermined period of time passes from a time that the collision is predicted by the collision predicting portion and the collision is not detected by the collision detecting portion. In this case, the adjusting device is returned to its original state by being adjusted at low speed, so the adjusting device can be returned to its original state without annoying the occupant.

Also, the occupant protection device described above may further include a collision detecting portion that detects the collision, and an adjustment amount detecting portion that detects an adjustment amount of the adjusting device. The control portion may first operate the adjusting device at the first speed, and then operate the adjusting device at the second speed until a predetermined adjustment amount is detected by the adjustment amount detecting portion when the collision is detected by the collision detecting portion. That is, when a collision is predicted, the adjusting device is adjusted at low speed and eases the restraint of the occupant to reduce discomfort to the occupant.

Furthermore, in the occupant protection device described above, the control portion may first operate the adjusting device at the first speed, and then prohibit the adjusting device from making an adjustment at the second speed when the adjustment amount of the adjusting device at the first speed that is detected by the adjustment amount detecting portion is less than a predetermined adjustment amount. That is, an adjustment by the adjusting device is prevented from being made often when the adjustment amount is small, which minimizes discomfort and annoyance to the occupant.

Also, in the occupant protection device described above, the adjusting device may be a device that adjusts a reclining angle of a seat back of a vehicle seat, and the like.

The invention also relates to a control method of the occupant protection device described above.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
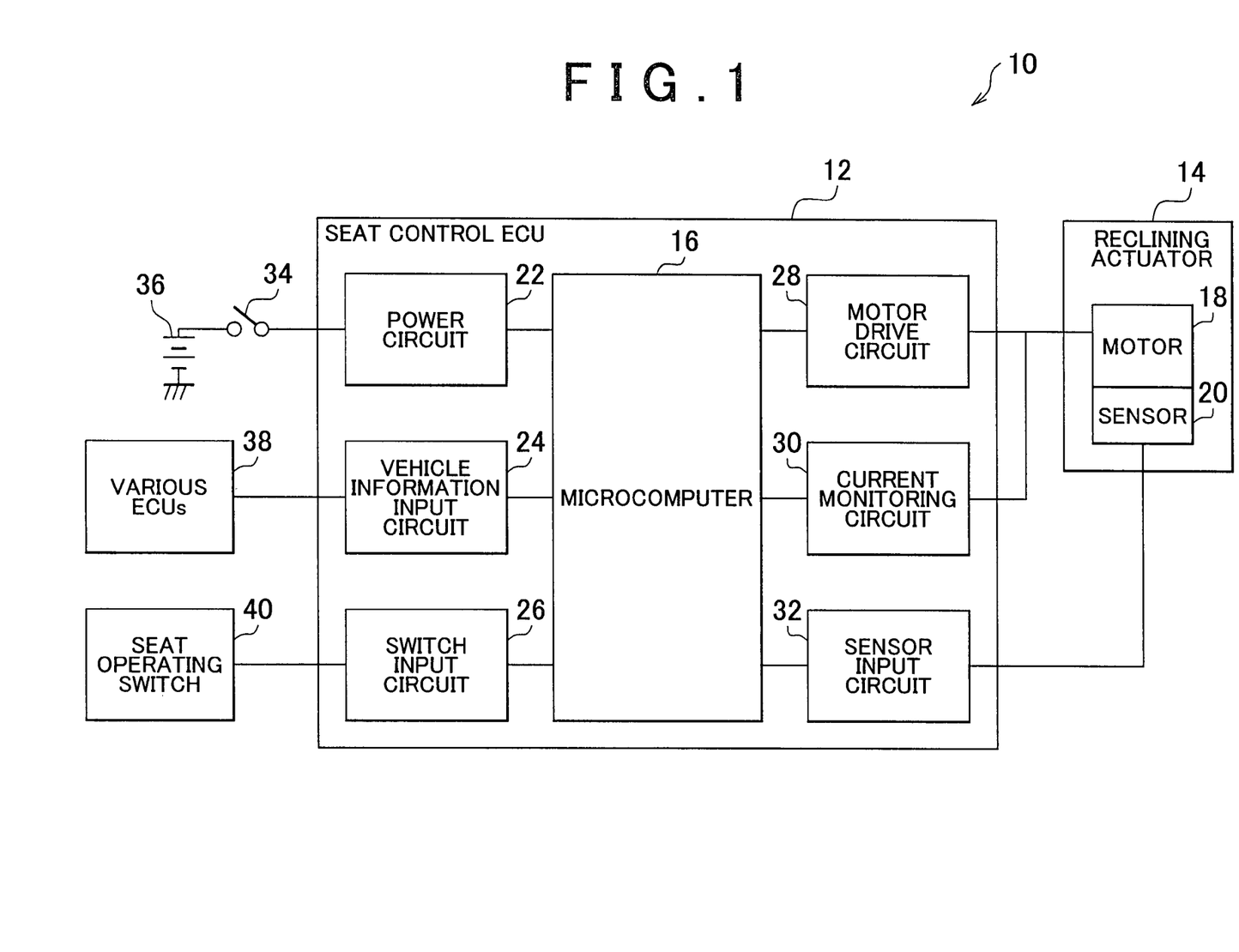
FIG. 1 is a block diagram of the general structure of a vehicle seat control apparatus according to a first embodiment of the invention.
Figure 2A:
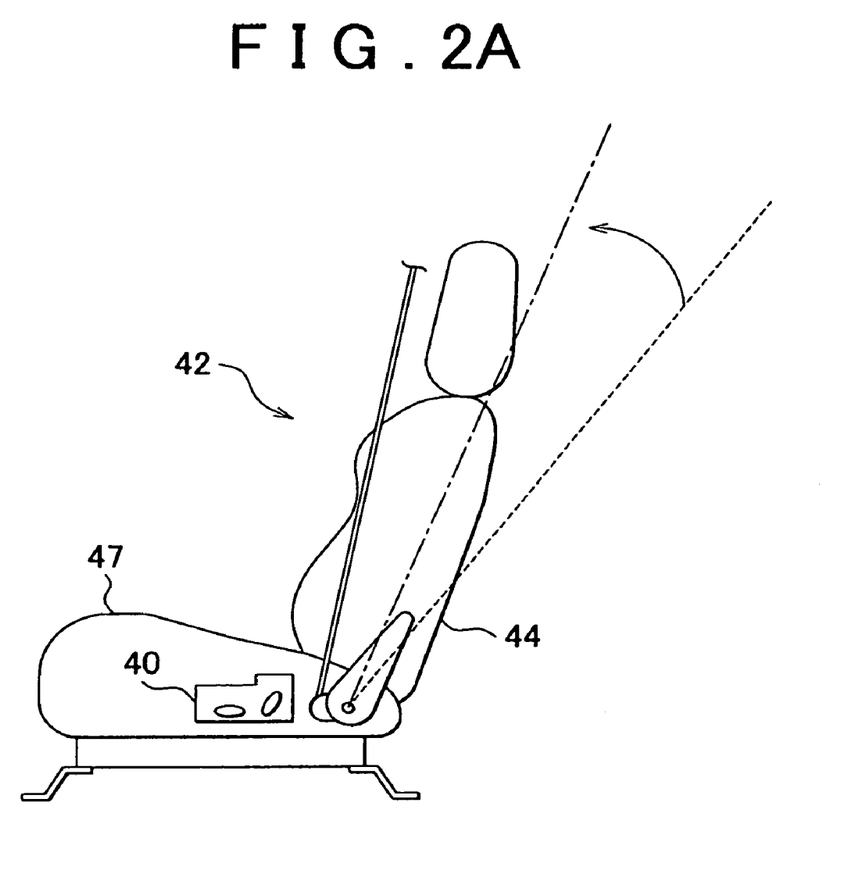
FIG. 2A is a view of one example of an arrangement of a seat operating switch.
Figure 2B:
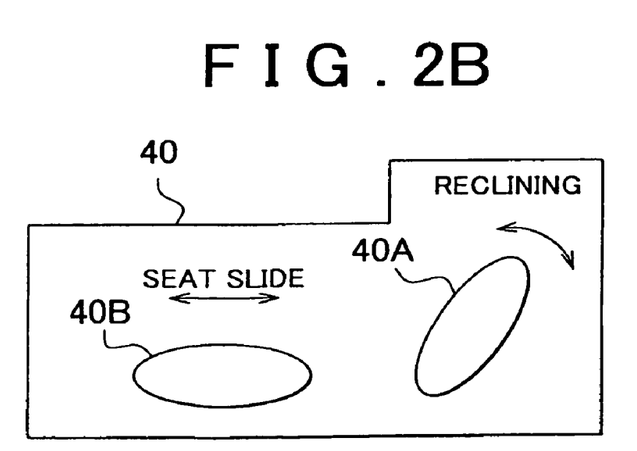
FIG. 2B is a view of one example of the seat operating switch.

A first embodiment of the present invention will be described in greater detail below with reference to the accompanying drawings. FIG. 1 is a block diagram of the general structure of a vehicle seat control apparatus, FIG. 2A is a view of one example of an arrangement of a seat operating switch in a seat 42, and FIG. 2B is a view of one example of the seat operating switch 40.

A vehicle seat control apparatus 10 includes a seat control ECU 12 (i.e., a control portion) for performing drive control of a seat back 44 of the vehicle seat 42, and a reclining actuator 14 for adjusting the reclining angle of the seat back 44 with respect to a seat cushion 47 (i.e., the angle between the seat back 44 and the seat cushion 47) by driving a reclining mechanism of the vehicle seat 42.

The seat control ECU 12 includes a microcomputer 16 that has a CPU, ROM, RAM, and an input/output interface. The reclining actuator 14 includes a motor 18 and a sensor 20 (adjustment amount detecting portion) for detecting the position (i.e., the reclining angle) of the seat back 44. Incidentally, the sensor 20 detects the reclining angle of the seat back 44 by detecting the rotation speed and rotational position and the like of the motor 18 using a Hall element, for example.

A power circuit 22, a vehicle information input circuit 24, a switch input circuit 26, a motor drive circuit 28, a current monitoring circuit 30, and a sensor input circuit 32 are connected to the microcomputer 16.

The power circuit 22 is connected to a battery 36 via a switch 34 and supplies power from the battery 36 to the microcomputer 16 and the like.

The vehicle information input circuit 24 is connected to various ECUs 38 that perform various control of the vehicle, so as to be able to communicate with those various ECUs 38.

The switch input circuit 26 is connected to a seat operating switch 40 that is operated by an occupant to adjust the seat back and a longitudinal position of the vehicle seat 42 (i.e., seat slide position) and the like. The seat operating switch 40 is provided on the side of the vehicle seat 42, as shown in FIG. 2A, for example. Also, the seat operating switch 40 includes a switch 40A used to adjust the reclining angle of the seat back 44, and a switch 40B used to adjust the longitudinal position of the vehicle seat 42 (i.e., seat slide position), as shown in FIG. 2B.

The motor 18 for driving the reclining actuator 14 is connected to the motor drive circuit 28 and is driven by this motor drive circuit 28. The motor 18 drives the reclining mechanism for adjusting the reclining angle of the seat back 44. Also, the driving speed of the motor 18 is varied according to the current supplied from the motor drive circuit 28 and the like.

The current monitoring circuit 30 detects the current supplied to the motor 18 from the motor drive circuit 28, and outputs a detection value to the microcomputer 16. The microcomputer 16 then controls the rotation speed of the motor 18 and the like based on this detection value of the current monitoring circuit 30.

The sensor 20 of the reclining actuator 14 is connected to the sensor input circuit 32, and a detection value of this sensor 20 is output to the microcomputer 16.

In this embodiment, a collision predicting ECU 46 (i.e., a collision predicting portion) that predicts a collision is connected as one of the various ECUs 38 to the vehicle information input circuit 24, as shown in FIG. 1.

Figure 3:
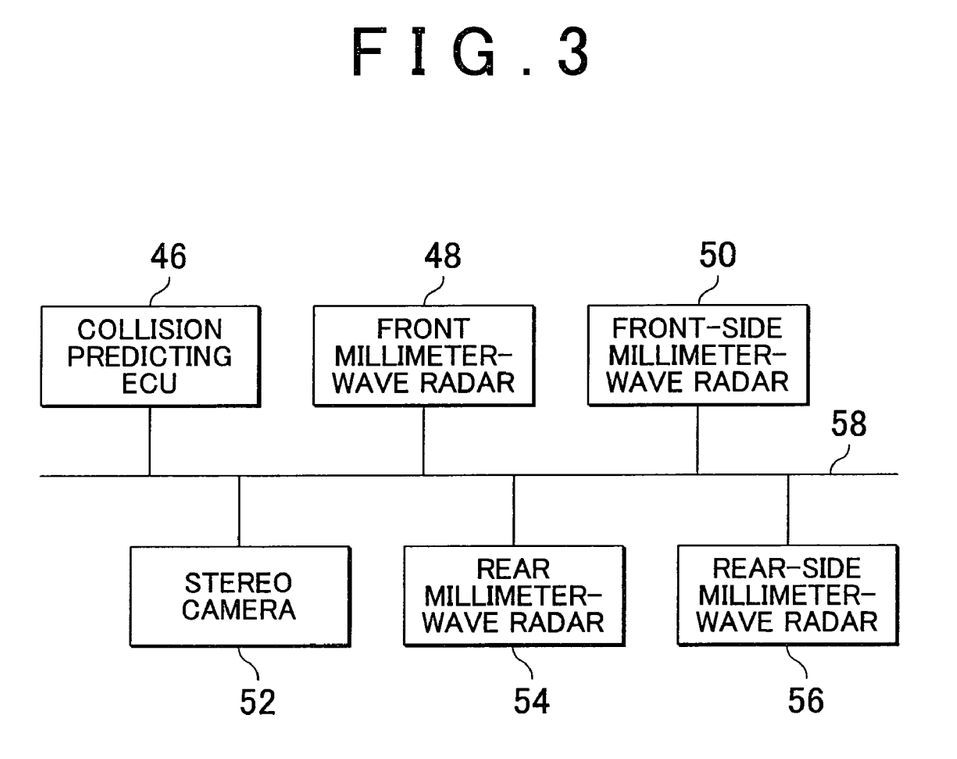
FIG. 3 is a block diagram of an example of a structure for determining a collision and a collision predicting ECU that is connected to a vehicle seat control ECU according to the first embodiment of the invention.

The collision predicting ECU 46 is connected to a bus 58, as shown in FIG. 3. Also connected to the bus 58 are a front millimeter-wave radar 48 for detecting the distance to an obstacle in front of the host vehicle, a front-side millimeter-wave radar 50 for detecting the distance to an obstacle to the side in front of the host vehicle, a stereo camera 52 that captures an image of the area in front of the host vehicle, a rear millimeter-wave radar 54 for detecting the distance to an obstacle in back of the host vehicle, and a rear-side millimeter-wave radar 56 for detecting the distance to an obstacle to the side in back of the host vehicle.

The front millimeter-wave radar 48, the front-side millimeter-wave radar 50, the stereo camera 52, the rear millimeter-wave radar 54, and the rear-side millimeter-wave radar 56 monitor the area around the host vehicle and output the monitoring results to the collision predicting ECU 46.

The front millimeter-wave radar 48 is provided near the center of the front grille, for example. Also, the front-side millimeter-wave radar 50 is provided near each end in the width direction in the front bumper, for example. The front millimeter-wave radar 48 and the front-side millimeter-wave radar 50 emit millimeter waves to the front and the front-side of the host vehicle, respectively, and receive the radio waves that have been reflected off of an object. The front millimeter-wave radar 48 and the front-side millimeter-wave radar 50 are provided to measure the relative speed and distance from the host vehicle to the object, for example, based on the travel time of the radio waves and the frequency difference that occurs due to the Doppler effect, and the like. Also, the rear millimeter-wave radar 54 and the rear-side millimeter-wave radar 56 are provided in the rear bumper or the like. The rear millimeter-wave radar 54 and the rear-side millimeter-wave radar 56 emit millimeter waves to the rear and the rear-side of the host vehicle, respectively, and receive the radio waves that have been reflected off of an object. The rear millimeter-wave radar 54 and the rear-side millimeter-wave radar 56 are provided to measure the relative speed and distance from the host vehicle to the object, for example, based on the travel time of the radio waves and the frequency difference that occurs due to the Doppler effect, and the like.

The stereo camera 52 is provided on an upper portion of the front windshield inside the vehicle cabin in a position near the center in the vehicle width direction. The stereo camera 52 is provided to capture an image of the area in front of the host vehicle, detect an obstacle in front of the vehicle, and measure the distance from the host vehicle to that obstacle. Incidentally, because the distance from the host vehicle to an obstacle is able to be detected using the front millimeter-wave radar 48 and the front-side millimeter-wave radar 50 and the like, the stereo camera 52 may be omitted.

The collision predicting ECU 46 obtains the detection values from the front millimeter-wave radar 48, the front-side millimeter-wave radar 50, the stereo camera 52, the rear millimeter-wave radar 54, and the rear-side millimeter-wave radar 56, and predicts whether there will be a collision. Since various well-known technologies can be employed to predict a collision, a detailed description will be omitted. For example, the collision predicting ECU 46 obtains the relative speed from the change in distance from the host vehicle to the obstacle based on the detection values from the front millimeter-wave radar 48, the front-side millimeter-wave radar 50, the stereo camera 52, the rear millimeter-wave radar 54, and the rear-side millimeter-wave 56, and calculates the predicted time-to-collision. If the predicted time-to-collision t that is calculated is within a preset time, the collision predicting ECU 46 determines that a collision is imminent.

In the vehicle seat control apparatus 10 structured as described above, the reclining angle of the seat back 44 is adjusted to match a target angle if a collision is predicted by the collision predicting ECU 46. As a result, at the time of collision, the posture of the occupant will be appropriate, thus enabling an occupant restraint device such as a seat belt or an air bag apparatus to reliably protect the occupant.

More specifically, when the collision predicting ECU 46 predicts a collision, it outputs a command signal to the seat control ECU 12. This command signal is a signal requesting that the driving speed of the motor 18 be increased to a fast speed. Then the seat control ECU 12 controls the motor drive circuit 28 to control the motor 18 so that the driving speed of the motor 18 comes to match the speed that is faster than the speed of the motor 18 when the seat is adjusted normally (i.e., when the seat is adjusted by operating the seat operating switch 40).

Also, in this embodiment, the motor 18 is driven at low speed to adjust (i.e., recline) the seat back 44 after a predetermined period of time (i.e., the time after which the seat back 44 no longer needs to be adjusted, e.g., the time until a collision is avoided or the time that it takes the vehicle to stop after a collision) has passed after the reclining angle of the seat back 44 has been adjusted to the preset target angle by driving the motor 18 at high speed in response to the command signal. At this time, the seat may be returned to the position before the motor 18 had been operated by driving the motor according to the command signal, or the motor 18 may be operated to recline the seat back 44 a predetermined angle. That is, when the reclining angle of the seat back 44 is adjusted such that the seat back 44 raises up, the occupant is restricted by a seat belt, but when the reclining angle of the seat back 44 is adjusted such that the seat back reclines, the occupant is able to be not as restricted by the seat belt, so discomfort and annoyance to the occupant are able to be minimized.

Figure 4:
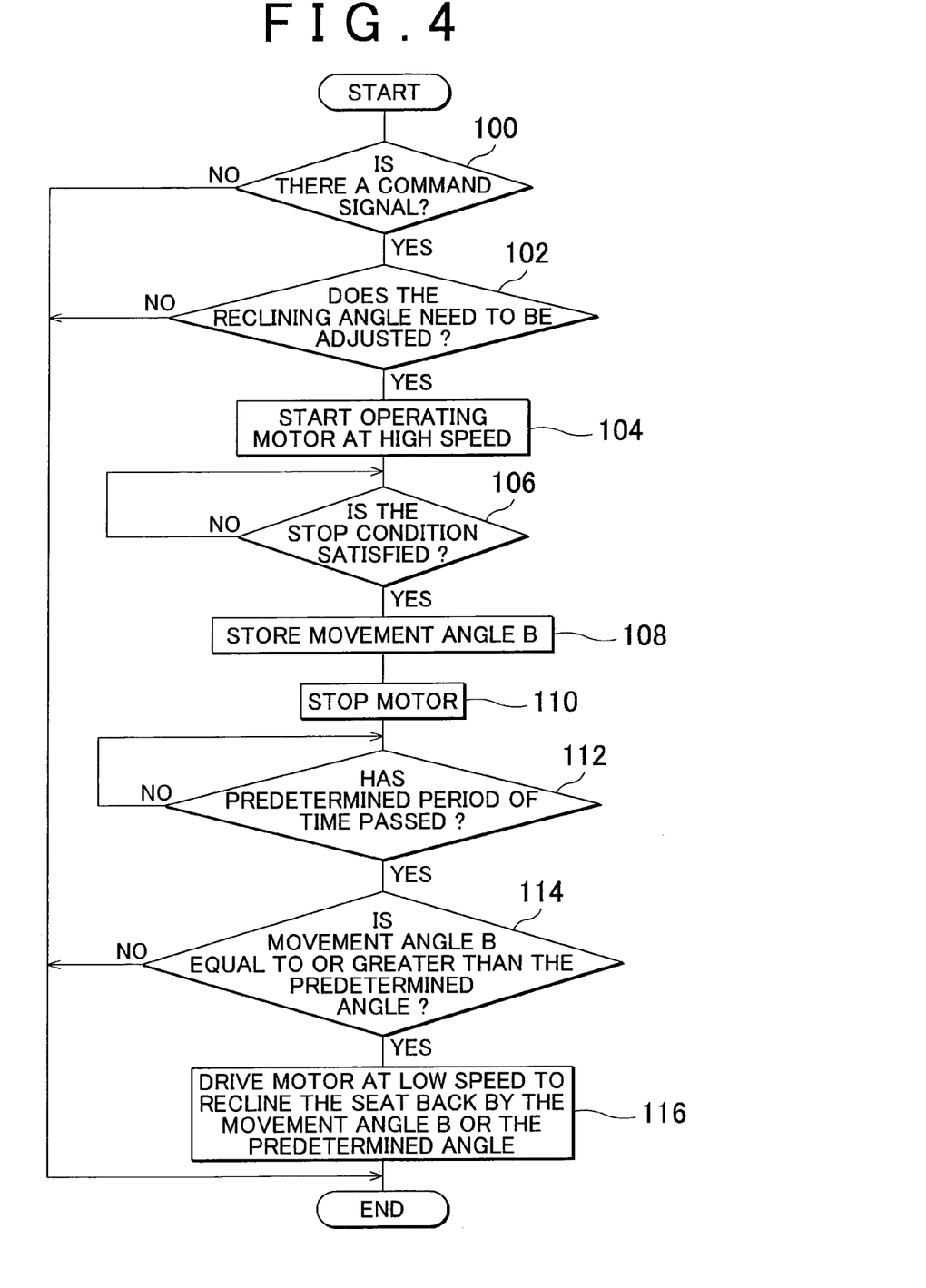
FIG. 4 is a flowchart illustrating a routine executed by a seat control ECU of the vehicle seat control apparatus according to the first embodiment of the invention.

Continuing on, a routine executed by the seat control ECU 12 of the vehicle seat control apparatus 10 will be described. FIG. 4 is a flowchart illustrating a routine executed by the seat control ECU 12 of the vehicle seat control apparatus 10 according to the first embodiment. Incidentally, in the routine in FIG. 4, the seat control ECU 12 obtains the detection value from the sensor 20 via the sensor input circuit 32 and uses it to determine whether the reclining angle matches a preset target angle. If the reclining angle does not match the target angle, the routine starts. Here, the target angle may be a target angle range that has a predetermined angle range.

First in step 100, the microcomputer 16 determines whether there is a command signal. This determination is made by the seat control ECU 12 determining whether a command signal for operating the motor 18 at the high speed has been input in the microcomputer 16 via the vehicle information input circuit 24 as a result of a prediction by the collision predicting ECU 46 that there will be a collision. If the determination is yes, then the process proceeds on to step 102. If, on the other hand, the determination is no, the routine ends.

In step 102, the microcomputer 16 determines whether the reclining angle of the seat back 44 needs to be adjusted. This determination is made by the microcomputer 16 obtaining the detection value from the sensor 20 via the sensor input circuit 32 and determining whether the reclining angle of the seat back 44 is equal to a preset target angle (or whether the detected reclining angle is within a target angle range) based on the obtained detection value from the sensor 20. If the determination is yes, the process proceeds on to step 104. If, on the other hand, the determination is no, then this cycle of the routine will end.

In step 104, the motor 18 starts to be operated at high speed. That is, the microcomputer 16 controls the motor drive circuit 28 to drive the motor 18 at the high speed. For example, when the seat is adjusted by an operation of the seat operating switch 40, the current value applied to the motor 18 is set to 50% of the maximum current value, and when a command signal to operate the motor 18 at high speed is output, 100% of the current value (i.e., the maximum current value) is applied to the motor 18 so that the motor 18 is driven at the speed that is faster than the speed of the motor 18 when the reclining angle is adjusted by the operation of the seat operating switch 40 performed by the occupant.

In step 106, the microcomputer 16 determines whether a preset stop condition is satisfied. In this determination, for example, the microcomputer 16 obtains the detection value from the sensor 20 via the sensor input circuit 32 and determines whether the detected reclining angle matches the preset target angle, whether a preset period of time has passed since the motor 18 started to operate at high speed, and whether the motor load has become equal to or greater than a preset load due to, for example, an object being caught in the seat adjusting mechanism or the like. The steps described above are repeated until at least one of these determinations is yes, and then the process proceeds on to step 108.

In step 108, a movement angle B of the seat back 44 is stored in the RAM or the like of the microcomputer 16. For example, the driving amount (adjustment amount) that the motor 18 is driven according to the command signal is detected by the sensor 20. This driving amount of the motor 18 corresponds to a numerical value of the reclining angle at the time when the motor 18 is stopped in step 106 minus the reclining angle obtained in step 102 (i.e., the reclining angle right before the motor 18 is operated at high speed). The microcomputer 16 obtains this driving amount, which is the detection value from the sensor, via the sensor input circuit 32 and stores it in memory. After step 108, the process proceeds on to step 110.

In step 110, operation of the motor 18 is stopped. That is, the microcomputer 16 controls the motor drive circuit 28 to stop the motor 18. Then the process proceeds on to step 112.

In step 112, the microcomputer 16 determines whether a predetermined period of time passes. This predetermined period of time is a preset period of time such as the period of time from after a collision has been predicted until the collision occurs or the period of time from after a collision has been predicted until the collision has been avoided. This determination is made by determining whether the predetermined period of time has passed. If the determination is no, this step is repeated until the determination is yes, in which case the process proceeds on to step 114.

In step 114, the microcomputer 16 determines whether the stored movement angle B of the seat back 44 is equal to or greater than a predetermined angle. This determination is made by the microcomputer 16 monitoring the detection value from the sensor 20 via the sensor input circuit 32 and determining whether the movement angle B is equal to or greater than the predetermined angle. If the determination is yes, the process proceeds on to step 116. If the determination is no, this cycle of the routine immediately ends. That is, if the seat back 44 is not operated the predetermined angle or greater, this cycle of the routine immediately ends. As a result, the frequency with which the seat back 44 is operated can be reduced, thus minimizing annoyance to the occupant. Incidentally, the predetermined angle may be several degrees.

In step 116, the motor 18 is driven at low speed to recline the seat back 44 by the stored movement angle B or the predetermined angle. That is, the microcomputer controls the motor drive circuit 28 to drive the motor 18 at low speed until an adjustment amount for the movement angle B or the predetermined angle is detected by the sensor 20. For example, the motor 18 is driven at low speed by applying a current value that is 50% of the maximum current value to the motor 18 to realize the adjustment amount for the movement angle B or the predetermined angle. As a result, the seat back 44 is adjusted at low speed so that the occupant moves away from the seat belt and a distance between the occupant and the seat belt, is increased. Thus, the occupant is not as restricted by the seat belt, which minimizes the annoyance to the occupant. Also, the seat back 44 is adjusted at low speed, which minimizes discomfort to the occupant. Incidentally, the predetermined angle in this step is an angle at which the occupant is no longer restricted by the seat belt, and may be several degrees, for example. After step 116, this cycle of the routine ends.

Continuing on, a vehicle seat control apparatus according to a second embodiment of the invention will be described. Incidentally, the structure of the vehicle seat control apparatus in this second embodiment is the same as the structure of the vehicle seat control apparatus in the first embodiment, so a detailed description thereof will be omitted.

In the first embodiment, after the motor 18 is driven at high speed to raise the seat back 44, control is performed to make bring the seat back 44 close to the original reclining angle regardless of whether a collision has been detected. However, in the second embodiment, after the seat back 44 is moved at high speed, different control is performed depending on whether a collision has been detected, i.e., one control is performed when a collision has been detected and another control is performed when a collision has not been detected. More specifically, after the motor 18 is driven at high speed to raise the seat back 44, control is performed to return the seat back 44 by the predetermined angle in the reclining direction when a collision has been detected, and control is performed to recline the seat back 44 by the amount moved (i.e., movement angle B) such that the reclining angle returns to the original angle when a collision has not been detected. Here, the predetermined angle by which the seat back 44 is returned when a collision has not been detected is slight and is an angle at which the occupant is no longer restricted by the seat belt. For example, the seat back 44 may be reclined by an angle that is one-half of the movement angle B, or the seat back 44 may be reclined by a preset angle (several degrees).

Figure 5:
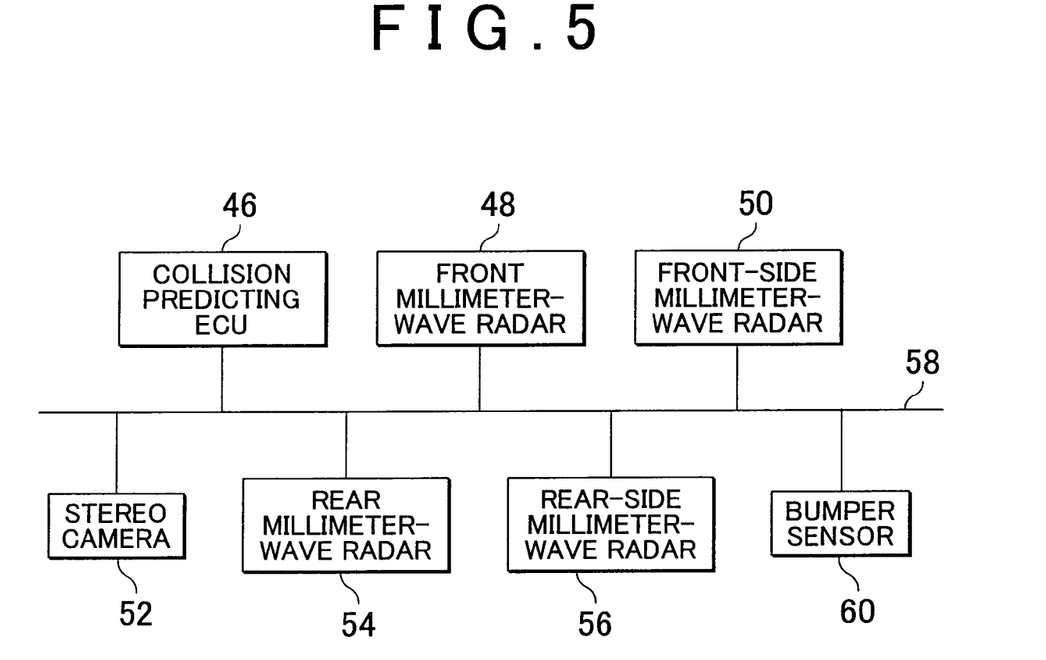
FIG. 5 is a block diagram of an example of a structure for determining a collision and a collision predicting ECU that is connected to a vehicle seat control ECU according to a second embodiment of the invention.

In this second embodiment, a bumper sensor 60 is connected to the same bus 50 that the collision predicting ECU 46 is connected to, as shown in FIG. 5. This bumper sensor 60 detects a collision. If a collision is detected, a signal indicating that a collision has been detected is output to the microcomputer 16 via the collision predicting ECU 46 and the vehicle information input circuit 24. Incidentally, in the second embodiment, the collision is detected by the bumper sensor 60, but the invention is not limited to this. That is, the collision may also be detected by any of a variety of types of sensors such as an acceleration sensor.

Figure 6:
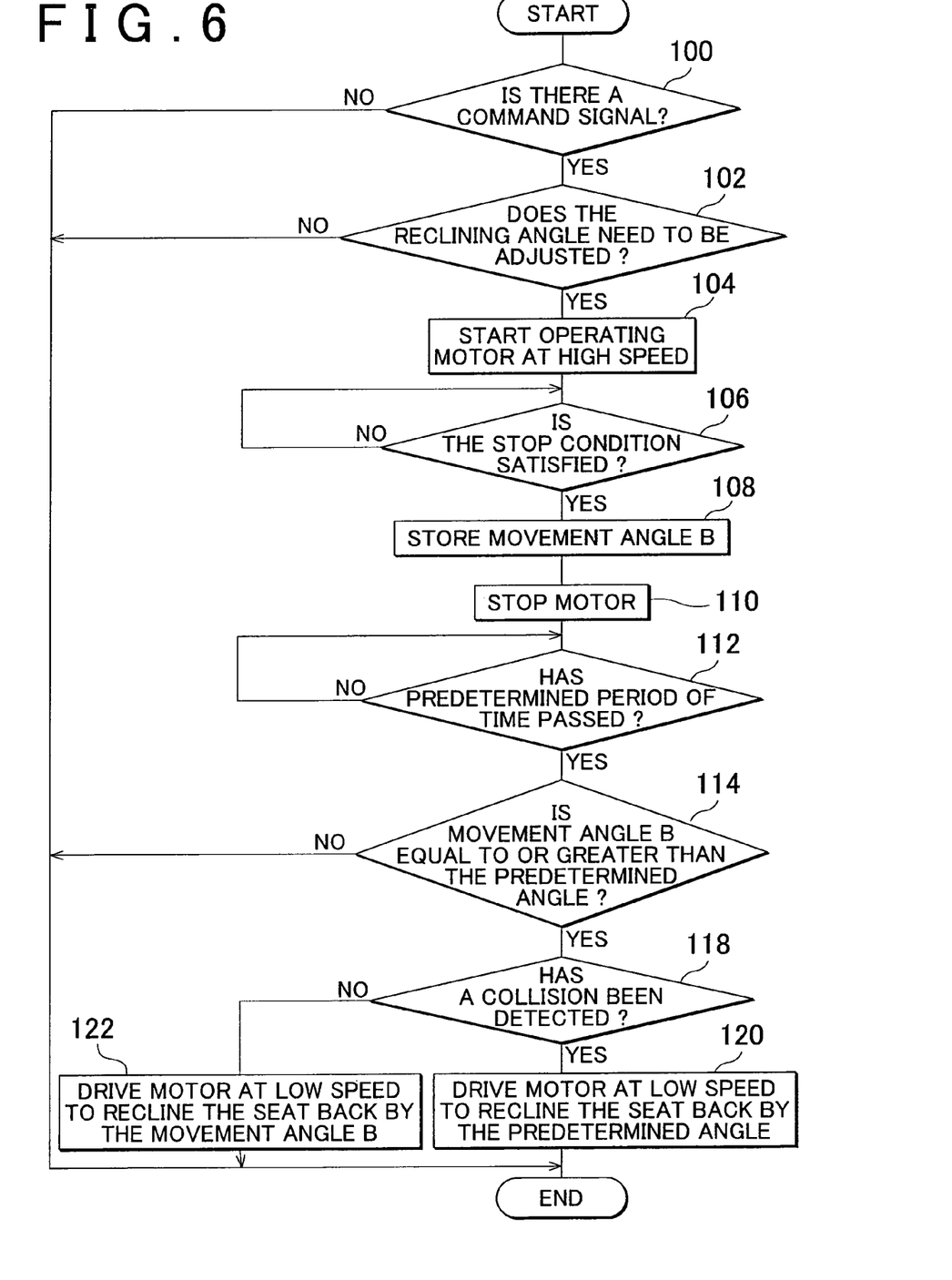
FIG. 6 is a flowchart illustrating a routine executed by a vehicle seat control ECU of a vehicle seat control apparatus according to the second embodiment of the invention.

Next, a routine executed by the seat control ECU 12 of the vehicle seat control apparatus according to this second embodiment of the invention will be described. FIG. 6 is a flowchart illustrating the routine executed by the vehicle seat control ECU 12 of the vehicle seat control apparatus. Incidentally, steps in this routine that are the same as steps in the routine in the first embodiment will be denoted by the same step numbers.

First in step 100, the microcomputer 16 determines whether there is a command signal. This determination is made by the microcomputer 16 determining whether a command signal for operating the motor 18 at the high speed has been input in the microcomputer 16 via the vehicle information input circuit 24 as a result of a prediction by the collision predicting ECU 46 that there will be a collision. If the determination is yes, then the process proceeds on to step 102. If, on the other hand, the determination is no, the routine ends.

In step 102, the microcomputer 16 determines whether the reclining angle of the seat back 44 needs to be adjusted. This determination is made by the microcomputer 16 obtaining the detection value from the sensor 20 via the sensor input circuit 32 and determining whether the reclining angle of the seat back 44 is equal to a preset target angle (or whether the detected reclining angle is within a target angle range) based on the obtained detection value from the sensor 20. If the determination is yes, the process proceeds on to step 104. If, on the other hand, the determination is no, then this cycle of the routine will end.

In step 104, the motor 18 starts to be operated at high speed. That is, the microcomputer 16 controls the motor drive circuit 28 to drive the motor 18 at the high speed. For example, when the seat is adjusted by an operation of the seat operating switch 40, the current value applied to the motor 18 is set to 50% of the maximum current value, and when a command signal to operate the motor 18 at high speed is output, 100% of the current value (i.e., the maximum current value) is applied to the motor 18 so that the motor 18 is driven at the speed that is faster than the speed of the motor 18 when the reclining angle is adjusted by the operation of the seat operating switch 40 performed by the occupant.

In step 106, the microcomputer 16 determines whether a preset stop condition is satisfied. In this determination, for example, the microcomputer 16 obtains the detection value from the sensor 20 via the sensor input circuit 32 and determines whether the detected reclining angle matches the preset target angle, whether a preset period of time has passed since the motor 18 started to operate at high speed, and whether the motor load has become equal to or greater than a preset load due to, for example, an object being caught in the seat adjusting mechanism or the like. The steps described above are repeated until at least one of these determinations is yes, and then the process proceeds on to step 108.

In step 108, a movement angle B of the seat back 44 is stored in the RAM or the like of the microcomputer 16. For example, the driving amount (adjustment amount) that the motor 18 is driven according to the command signal is detected by the sensor 20. This driving amount of the motor 18 corresponds to a numerical value of the reclining angle at the time when the motor 18 is stopped in step 106 minus the reclining angle obtained in step 102 (i.e., the reclining angle right before the motor 18 is operated at high speed). The microcomputer 16 obtains this driving amount, which is the detection value from the sensor, via the sensor input circuit 32 and stores it in memory. After step 108, the process proceeds on to step 110.

In step 110, operation of the motor 18 is stopped. That is, the microcomputer 16 controls the motor drive circuit 28 to stop the motor 18. Then the process proceeds on to step 112.

In step 112, the microcomputer 16 determines whether a predetermined period of time has passed. This predetermined period of time is a preset period of time such as the period of time from after a collision has been predicted until the collision occurs or the period of time from after a collision has been predicted until the collision has been avoided. This determination is made by determining whether the predetermined period of time has passed. If the determination is no, this step is repeated until the determination is yes, in which case the process proceeds on to step 114.

In step 114, the microcomputer 16 determines whether the stored movement angle B of the seat back 44 is equal to or greater than a predetermined angle. This determination is made by the microcomputer 16 monitoring the detection value from the sensor 20 via the sensor input circuit 32 and determining whether the movement angle B is equal to or greater than the predetermined angle. If the determination is yes, the process proceeds on to step 116. If the determination is no, this cycle of the routine immediately ends. That is, if the seat back 44 is not operated the predetermined angle or greater, this cycle of the routine immediately ends. As a result, the frequency with which the seat back 44 is operated can be reduced, thus minimizing annoyance to the occupant. Incidentally, the predetermined angle may be several degrees.

In step 118, the microcomputer 16 determines whether a collision has been detected. This determination is made by detecting a collision using the bumper sensor 60 and determining whether a signal indicating that a collision has been detected via the collision predicting ECU 46 and the vehicle information input circuit 24 has been received by the microcomputer 16. If the determination is yes, the process proceeds on to step 120. If, on the other hand, the determination is no, the process proceeds on to step 122.

In step 120, the motor 18 is driven at low speed to recline the seat back 44 by the predetermined angle in the reclining direction. That is, the microcomputer 16 controls the motor drive circuit 28 to drive the motor 18 at low speed until the adjustment amount for the predetermined angle is detected by the sensor 20. For example, the motor 18 is driven at low speed by applying a current value that is 50% of the maximum current value to the motor 18 until the adjustment amount for the predetermined angle is detected. As a result, the seat back 44 is adjusted at low speed so that the occupant moves away from the seat belt and the distance between the occupant and the seat belt is increased. Thus, the occupant is not as restricted by the seat belt, which minimizes the annoyance to the occupant. Also, the seat back 44 is adjusted at low speed, so the seatbelt is able to be unfastened easier after a collision. Incidentally, the predetermined angle in this step is an angle at which the occupant is no longer restricted by the seat belt, and may be several degrees, for example. After step 120, this cycle of the routine ends.

Also, in step 122, the motor 18 is driven at low speed so that the seat back 44 reclines by the stored movement angle B. That is, the microcomputer 16 controls the motor drive circuit 28 to drive the motor 18 at low speed until the adjustment amount for the movement angle B is detected by the sensor 20. For example, the motor 18 is driven at low speed by applying a current value that is 50% of the maximum current value to the motor 18 to realize the adjustment amount for the movement angle B. As a result, the seat back 44 is adjusted at low speed so that the occupant moves away from the seat belt and the distance between the occupant and the seat belt is increased, and the reclining angle is returned to the angle before the motor 18 had been operated. Thus, the occupant is not as restricted by the seat belt, which minimizes the annoyance to the occupant. Also, the seat back 44 is adjusted at low speed, which minimizes discomfort to the occupant. After step 122, this cycle of the routine ends.

Figure 7A:
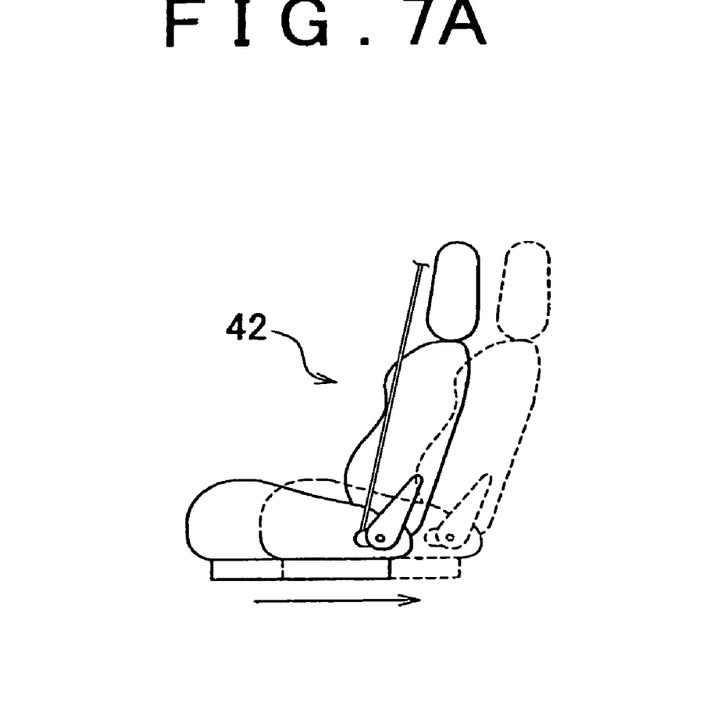
FIG. 7A is a view of the operating state of a mechanism that moves a vehicle seat forward and backward by sliding, as a mechanism that relatively adjusts the positional relationship between a seat belt and an occupant.
Figure 7B:
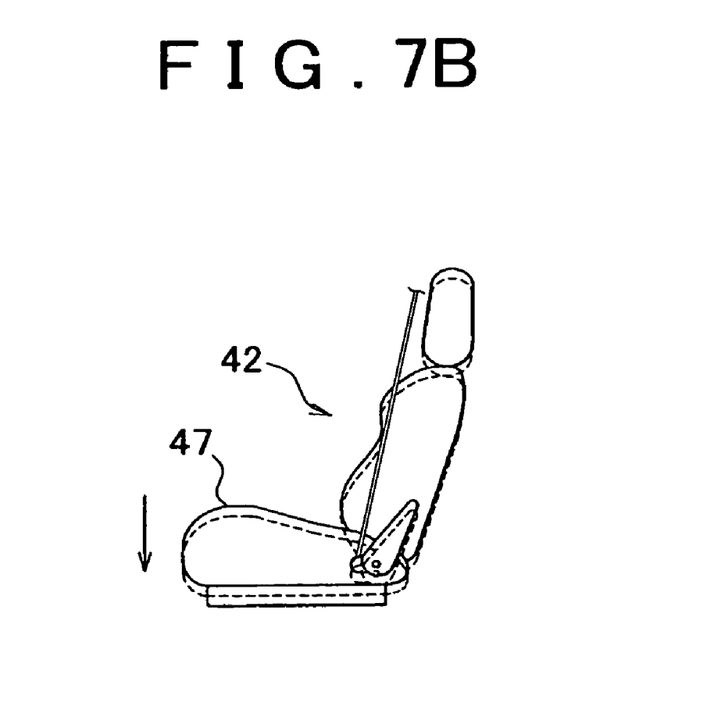
FIG. 7B is a view of the operating state of a mechanism that moves a vehicle seat or a seat cushion vertically with respect to the floor of the vehicle, as a mechanism that relatively adjusts the positional relationship between the seat belt and the occupant.
Figure 7C:
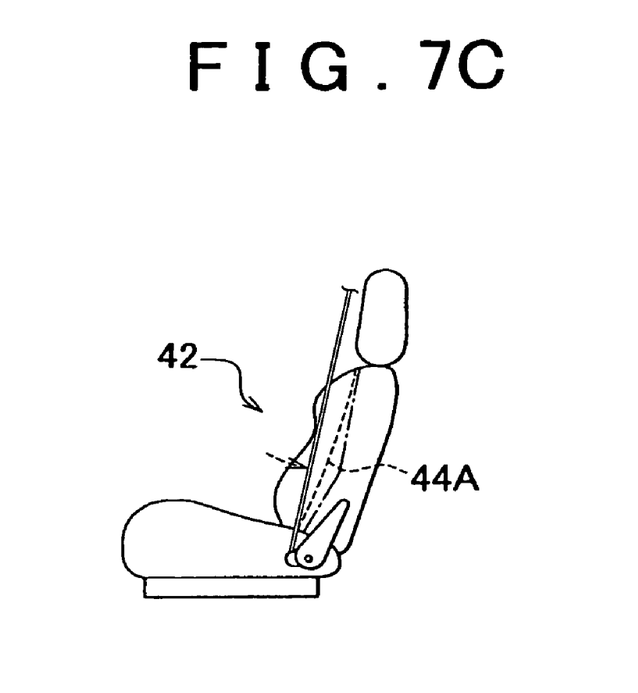
FIG. 7C is a view of the operating state of a mechanism that seat back mid portion opposite the lumbar portion of the occupant, as a mechanism that relatively adjusts the positional relationship between the seat belt and the occupant.
Figure 7D:
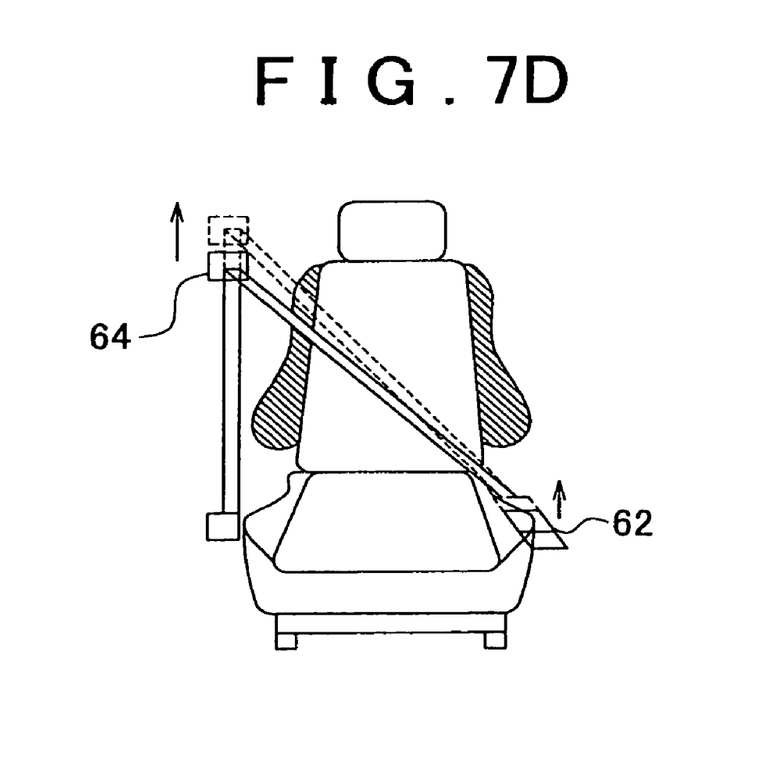
FIG. 7D is a view of the operating state of a mechanism that moves a seat belt anchor or a shoulder belt anchor vertically with respect to the floor of the vehicle, as a mechanism that relatively adjusts the positional relationship between the seat belt and the occupant.

Incidentally, in the first and second embodiments described above, when a collision is predicted, the reclining angle of the seat back 44 is adjusted, and then the seat back 44 is adjusted to recline so that the occupant moves away from the seat belt. However, the mechanism for relatively adjusting the positional relationship between the seat belt and the occupant is not limited to one that adjusts the reclining angle of the seat back 44. For example, as shown in FIG. 7A, an actuator may be provided for sliding a vehicle seat 42 in the longitudinal direction of the vehicle, and the occupant may be moved away from the seat belt by sliding the seat such that a distance between the seat belt and the occupant is increased. Also, as shown in FIG. 7B, an actuator may be provided for moving the vehicle seat 42 or a seat cushion 47 in the vertical direction with respect to the floor of the vehicle, and the occupant may be moved away from the seat belt by moving the vehicle seat 42 or the seat cushion 47 downward such that a distance between the seat belt and the occupant is increased. Further, as shown in FIG. 7C, an actuator may be provided for adjusting a seat back mid portion 44A opposite the lumbar portion of the occupant, and the occupant may be moved away from the seat belt by moving the seat back mid portion 44A toward the rear of the vehicle such that a distance between the seat belt and the occupant is increased. Moreover, as shown in FIG. 7D, an actuator may be provided for moving a seat belt anchor 62, which is a fixed portion, in the vertical direction with respect to the floor of the vehicle, and the occupant may be moved away from the seat belt by adjusting the seat belt anchor 62 upward such that a distance between the seat belt and the occupant is increased. Also, as shown in FIG. 7D, an actuator may be provided for moving a shoulder belt anchor 64, which is a fixed portion that is fixed to a pillar portion, of seat belt in the vertical direction, and the occupant may be moved away from the seat belt by moving the shoulder belt anchor 64 upward such that a distance, between the seat belt and the occupant is increased. Also, any of the various seat adjustments and the various belt anchor adjustments may also be appropriately combined.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. An occupant protection device comprising:
   a seat belt for restraining an occupant;
   an adjusting device that relatively adjusts a positional relationship between the seat belt and the occupant;

a collision predicting portion that predicts a collision;
a control portion that controls the adjusting device when the collision is predicted by the collision predicting portion;
a collision detecting portion that detects the collision; and
an adjustment amount detecting portion that detects an adjustment amount of the adjusting device,
wherein the control portion first makes the adjusting device to operate at a first speed to restrain the occupant by the seat belt, and then makes the adjusting device to increase a distance between the seat belt and the occupant at a second speed that is slower than the first speed, and
wherein the control portion first makes the adjusting device to operate at the first speed when the collision is predicted, and then makes the adjusting device to operate at the second speed until a predetermined adjustment amount is detected by the adjustment amount detecting portion when the collision is detected by the collision detecting portion, a movement with the second speed is directed to increasing a distance between the seat belt and the occupant by adjusting a reclining angle of a seatback.

2. The occupant protection device according to, claim 1, wherein the adjustment amount is an amount adjusted by the adjusting device from a time that the adjusting device starts being operated at the first speed until a time that the adjusting device stops being operated at the first speed; and
wherein the control portion makes the adjusting device to operate by the adjustment amount at the second speed.

3. The occupant protection device according to, claim 2, wherein the control portion makes the adjusting device to operate at the second speed when a predetermined period of time passes from a time that the collision is predicted by the collision predicting portion and the collision is not detected by the collision detecting portion.

4. The occupant protection device according to, claim 2, wherein the control portion first makes the adjusting device to operate at the first speed, and then prohibits the adjusting device from making an adjustment at the second speed when the adjustment amount of the adjusting device at the first speed that is detected by the adjustment amount detecting portion is less than a predetermined adjustment amount.

5. The occupant protection device according to, claim 1, wherein the control portion makes the adjusting device to operate at the second speed when a predetermined period of time passes from a time that the collision is predicted by the collision predicting portion.

6. The occupant protection device according to, claim 1, further comprising a vehicle seat having a seat back and a seat cushion,
wherein the adjusting device makes an adjustment to increase the distance between the seat belt and the occupant by increasing a reclining angle of the seat back of the vehicle seat; and the reclining angle is an angle between the seat back and the seat cushion.

7. The occupant protection device according to, claim 1, further comprising a vehicle seat,
wherein the adjusting device makes an adjustment to increase the distance between the seat belt and the occupant by sliding the vehicle seat rearward.

8. The occupant protection device according to, claim 1, further comprising a vehicle seat,
wherein the adjusting device makes an adjustment to increase the distance between the seat belt and the occupant by moving a vehicle seat downward.

9. The occupant protection device according to, claim 1, further comprising a vehicle seat having a seat back,
wherein the adjusting device makes an adjustment to increase the distance between the seat belt and the occupant by moving a vertically mid portion of the seat back of the vehicle seat rearward.

10. The occupant protection device according, claim 1, wherein the adjusting device makes an adjustment to increase the distance between the seat belt and the occupant by moving a fixed portion of the seat belt upward.

11. A control method for an occupant protection device, comprising:
predicting a collision;
operating an adjusting device that relatively adjusts a positional relationship between a seat belt for restraining an occupant and the occupant at a first speed when the collision is predicted; and
operating the adjusting device to increase a distance between the seat belt and the occupant at a second speed that is slower than the first speed,
wherein the adjusting device is operated at the first speed when the collision is predicted, and then the adjusting device is made to operate at the second speed until a predetermined adjustment amount is detected when the collision is detected, a movement with the second speed is directed to increasing a distance between the seat belt and the occupant by adjusting a reclining angle of a seatback.

* * * * *